(No Model.)

P. H. KULL.
CLEVIS.

No. 418,031. Patented Dec. 24, 1889.

Witnesses
Geo. W. Young.
N. E. Oliphant

Inventor
Phillip H. Kull
By Stout & Underwood
Attorneys

UNITED STATES PATENT OFFICE.

PHILLIP H. KULL, OF GENOA JUNCTION, WISCONSIN.

CLEVIS.

SPECIFICATION forming part of Letters Patent No. 418,031, dated December 24, 1889.

Application filed January 9, 1889. Serial No. 295,823. (No model.)

*To all whom it may concern:*

Be it known that I, PHILLIP H. KULL, of Genoa Junction, in the county of Walworth, and in the State of Wisconsin, have invented certain new and useful Improvements in Clevises; and I do hereby declare that the following is a full, clear, and exact description thereof.

My invention relates to clevises; and it consists in certain peculiarities of construction and combination of parts to be hereinafter described with reference to the accompanying drawings and subsequently claimed.

Figure 1:
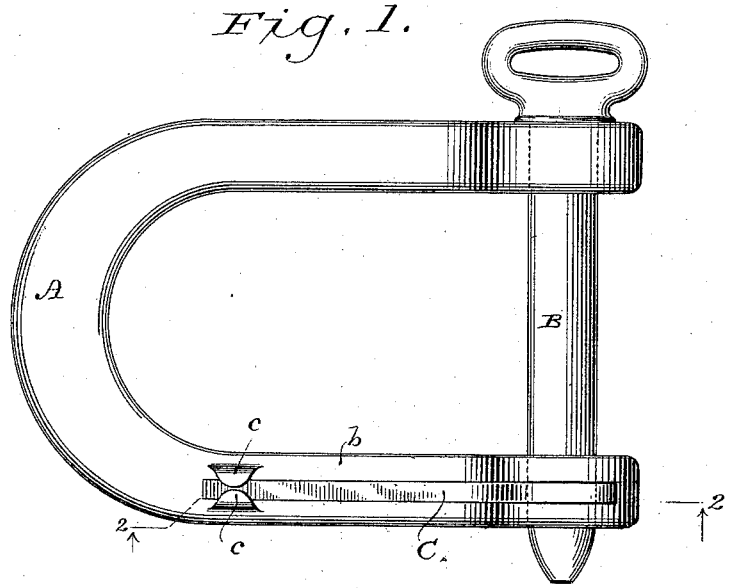
Figure 2:
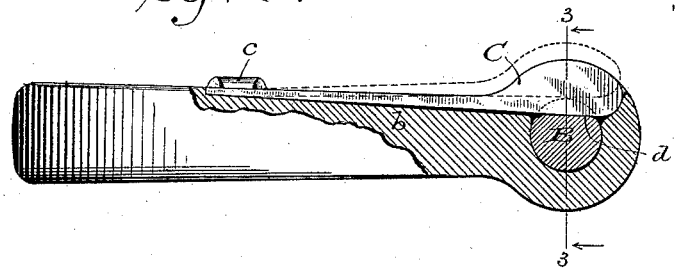

In the drawings, Figure 1 represents a side elevation of a clevis constructed according to my invention; Fig. 2, an under side view, partly in section, on the line 2 2 of Fig. 1; and Fig. 3, a section on line 3 3 of Fig. 2.

Figure 3:
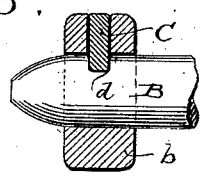

Referring by letter to the drawings, A represents the yoke of my clevis, and B the pin that is detachably retained in openings in the ends of said yoke. One arm $b$ of the yoke A is longitudinally recessed and provided with lugs $c$, the latter being bent down to confine a spring-latch C within said recess. A portion of the longitudinal recess intercepts the opening at right angles to the latter in the arm $b$ of the yoke A, and thus the free end of the spring-latch C depends into said opening, as best illustrated in Figs. 2 and 3, and the upper edge of said spring-latch is flush with said arm. The free end of the spring-latch C is designed to engage a notch $d$, cut in one end of the pin B, and thus locks the latter in its position with relation to the yoke. The notched end of the pin B is tapered, and thus when said pin is inserted in the arm $b$ of the yoke the free end of the spring-latch C is automatically raised out of its normal position. After its insertion in the arm $b$ of the yoke the pin B is turned until its notch $d$ comes into register with said spring-latch, when the latter automatically returns to its normal position and said pin is locked in place.

To remove the pin B, it is simply turned until the spring-latch C is disengaged from the notch $d$, thus leaving said pin free for withdrawal.

While I have shown and described the arm $b$ of the yoke A as provided with lugs $c$, it is obvious that other suitable means may be employed for the purpose of holding the spring-latch C in position with relation to said yoke-arm.

Having thus fully described my invention, what I claim as new, and desire to secure by Letters Patent, is—

1. The combination of the yoke A, having openings in the ends of its arms and one arm $b$ thereof provided with a longitudinal recess that intercepts the opening therein at right angles, the spring-latch C, retained in the recessed arm to have its free end normally depend into the opening in said yoke-arm, and the pin B, inserted in the openings in both yoke-arms and provided with a tapered end having a notch $d$, for engagement with said free end of the spring-latch, substantially as set forth.

2. The combination of the yoke A, having openings in the ends of its arms and one arm $b$ thereof provided with a longitudinal recess that intercepts the opening therein at right angles, the lugs $c$ on the yoke-arm $b$, the spring-latch C, retained in the recess in said arm by means of the lugs to have its free end normally depend into the opening in said yoke-arm, and the pin B, inserted in the openings in both yoke-arms and provided with a tapered end having a notch $d$, for engagement with the free end of the spring-latch, substantially as set forth.

In testimony that I claim the foregoing I have hereunto set my hand, at Richmond, in the county of McHenry and State of Illinois, in the presence of two witnesses.

PHILLIP H. KULL.

Witnesses:
J. V. ALDRICH,
N. P. MADOR.